United States Patent
Bahadirov (10) Patent No.: US 10,440,566 B2
(45) Date of Patent: Oct. 8, 2019

(54) METHOD AND APPARATUS FOR AUTOMATED LOCKING OF ELECTRONIC DEVICES IN CONNECTED ENVIRONMENTS

(71) Applicant: Samsung Electronics Co., Ltd., Suwon-si, Gyeonggi-do (KR)

(72) Inventor: Izzat Bahadirov, Monmouth Junction, NJ (US)

(73) Assignee: Samsung Electronics Co., Ltd., Suwon-si (KR)

(*) Notice: Subject to any disclaimer, the term of this patent is extended or adjusted under 35 U.S.C. 154(b) by 7 days.

(21) Appl. No.: 14/745,155

(22) Filed: Jun. 19, 2015

(65) Prior Publication Data

US 2016/0373926 A1 Dec. 22, 2016

(51) Int. Cl.
| | |
|---|---|
| H04W 12/06 | (2009.01) |
| H04L 29/08 | (2006.01) |
| G06F 21/88 | (2013.01) |
| H04L 12/28 | (2006.01) |
| H04L 12/64 | (2006.01) |

(52) U.S. Cl.
CPC ............ *H04W 12/06* (2013.01); *G06F 21/88* (2013.01); *H04L 12/282* (2013.01); *H04L 12/2803* (2013.01); *H04L 12/6418* (2013.01); *H04L 67/18* (2013.01); *H04L 67/24* (2013.01); *G06F 2221/2111* (2013.01); *H04L 2012/2841* (2013.01)

(58) Field of Classification Search
CPC .................................. G06F 21/88; G06F 21/55
USPC ...................................................... 455/404.2
See application file for complete search history.

(56) References Cited

U.S. PATENT DOCUMENTS

| | | | | |
|---|---|---|---|---|
| 6,002,427 | A * | 12/1999 | Kipust | G06F 21/552 340/571 |
| 8,577,294 | B2 * | 11/2013 | Causey | G08B 13/1427 340/5.31 |
| 2004/0155777 | A1 * | 8/2004 | Mitchell | G08B 13/1427 340/568.1 |
| 2008/0238669 | A1 | 10/2008 | Linford | |
| 2011/0102137 | A1 * | 5/2011 | Schroter | G06K 9/0004 340/5.52 |
| 2013/0300534 | A1 * | 11/2013 | Myllymaki | G06F 21/31 340/5.64 |
| 2013/0342314 | A1 * | 12/2013 | Chen | G07C 9/00309 340/5.65 |
| 2016/0343189 | A1 * | 11/2016 | Dumas | G07C 9/00309 |
| 2017/0109952 | A1 * | 4/2017 | Johnson | G07C 9/00309 |

OTHER PUBLICATIONS

Extended European Search Report dated Sep. 13, 2015 in connection with European Application No. 16167245.6, 9 pages.

* cited by examiner

*Primary Examiner* — Shahriar Behnamian (57) ABSTRACT

A method and apparatus are provided for securing electronic devices. The method includes identifying a plurality of electronic devices. The plurality of electronic devices includes at least one stationary device connected to a home network and at least one personal device associated with the home network. The method also includes monitoring the home network for a presence event. The method also includes, responsive to an occurrence of the presence event, determining after a predetermined period of time whether one of the at least one personal device is present. The method also includes locking or unlocking the at least one stationary device when none of the at least one personal device is present.

23 Claims, 9 Drawing Sheets

METHOD AND APPARATUS FOR AUTOMATED LOCKING OF ELECTRONIC DEVICES IN CONNECTED ENVIRONMENTS

TECHNICAL FIELD

The present application relates generally to electronic device security and, more specifically, to automated locking of electronic devices in connected environments.

BACKGROUND

Electronic devices are one of primary targets of theft during house and car burglaries, and rate of their recovery is small. In addition to their high resale price, electronic devices usually contain sensitive information, which may be used to commit electronic crimes, such as identity theft. Therefore, protecting them even in home environment would provide great benefit to the user. Currently securing a house does not fully secure devices within a house. A homeowner relies on house security to secure data stored on electronic devices inside the house. Securing all devices before leaving is a tedious and time-consuming process. The homeowner either leaves the devices unlocked or locking each device and spending time unlocking every device for use.

SUMMARY

A method is provided for securing electronic devices. The method includes identifying a plurality of electronic devices. The plurality of electronic devices includes at least one stationary device connected to a home network and at least one personal device associated with the home network. The method also includes monitoring the home network for a presence event. The method also includes, responsive to an occurrence of the presence event, determining after a predetermined period of time whether one of the at least one personal device is present. The method also includes locking or unlocking the at least one stationary device when none of the at least one personal device is present.

An apparatus is provided for securing electronic devices. The apparatus includes a memory element and processing circuitry. The processing circuitry is configured to identify a plurality of electronic devices. The plurality of electronic devices includes at least one stationary device connected to a home network and at least one personal device associated with the home network. The processing circuitry is also configured to monitor the home network for a presence event. The processing circuitry is also configured to, responsive to an occurrence of the presence event, determine after a predetermined period of time whether one of the at least one personal device is present. The processing circuitry is also configured to lock or unlock the at least one stationary device when none of the at least one personal device is present.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus and method.

Figure 1A:
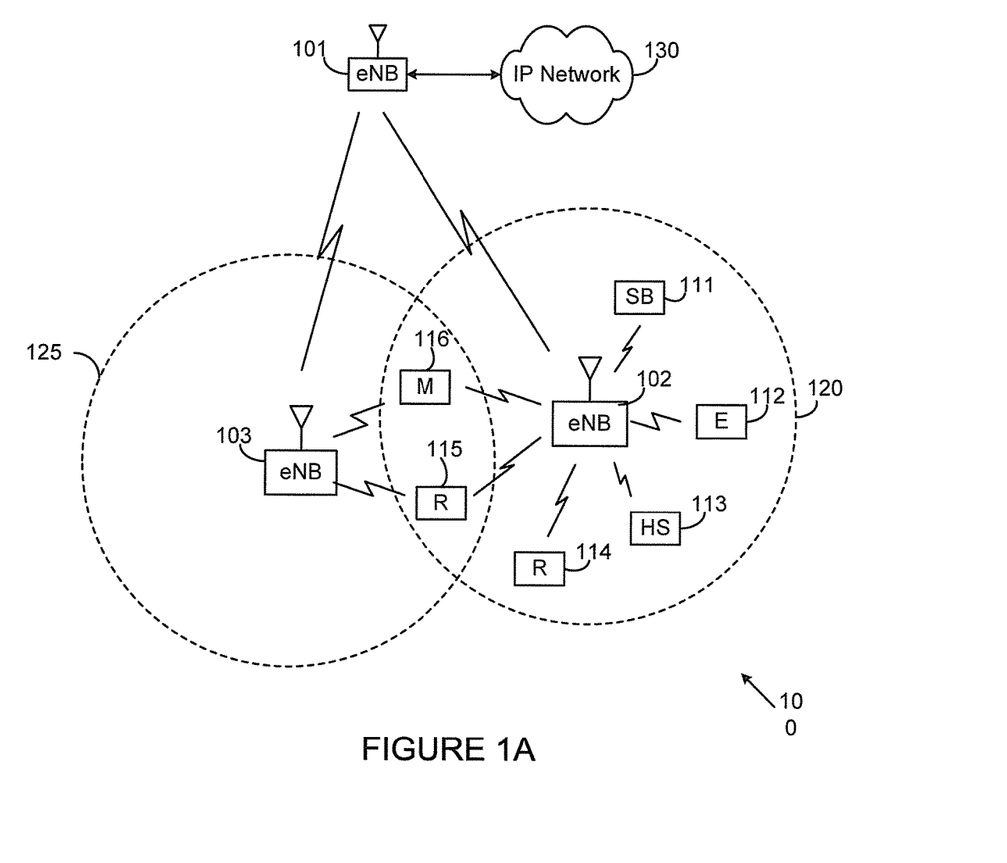
FIG. 1A illustrates an example wireless network according to this disclosure.

FIG. 1A illustrates an example wireless network 100 according to this disclosure. The embodiment of the wireless network 100 shown in FIG. 1A is for illustration only. Other embodiments of the wireless network 100 could be used without departing from the scope of this disclosure.

As shown in FIG. 1A, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. One or more of the UEs 111-116 can be peripheral or wearable device like a watch, wristband, and the like. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1A illustrates one example of a wireless network 100, various changes may be made to FIG. 1A. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 1B:
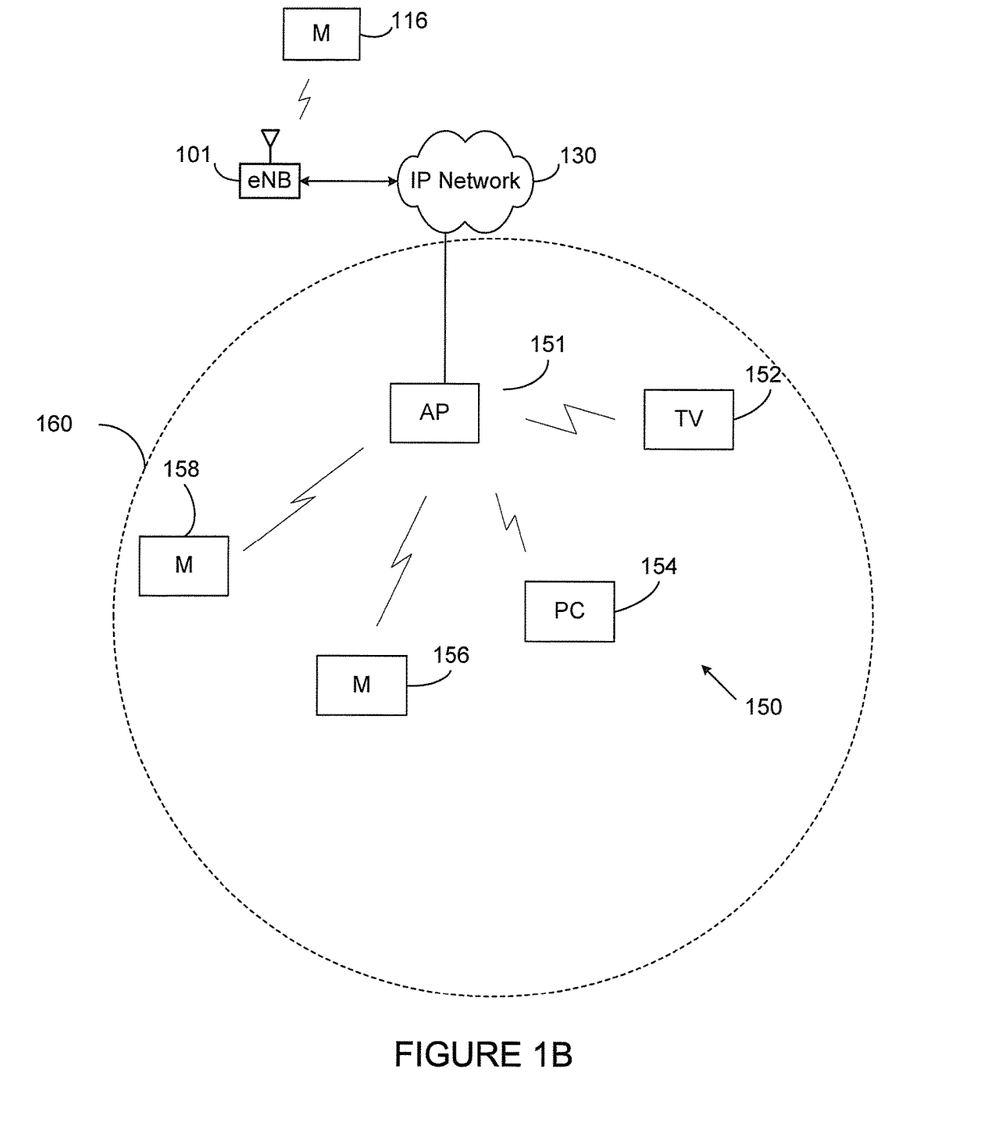
FIG. 1B is a diagram of a home network according to an embodiment of this disclosure.

FIG. 1B is a diagram of a home network 150 according to an embodiment of this disclosure. The embodiment of the home network 150 illustrated in FIG. 1B is for illustration only. However, home networks come in a wide variety of configurations, and FIG. 1B does not limit the scope of this disclosure to any particular implementation of a home network.

Referring to FIG. 1B, the home network 150 according an embodiment may include an access point 151, a television 152, a desktop computer 154, UEs 156 and 158 located inside a home, and one or more UE 116 located outside the home. The access point 151 can be one example of an eNB 102-103 as shown in FIG. 1A. UEs 156, 158, and 116 can be mobile devices, such as a cell phone, a wireless laptop, a wireless PDA, or the like. Some of the devices in home network 150 may be stationary devices, while other devices may be personal devices.

Personal devices are capable of affecting an alarm of the home or home network 150, while stationary devices do not affect the alarm. In the home, there are some devices that always/usually remain in the home or connected to home network 150 (TV, computer, laptop, router, tablet), and there are devices that travel with the users (smartphone, wearable, car), should the user leave the house. In one embodiment, the devices that remain the in house can be stationary devices, and devices that travel with the user can be personal devices. The devices can be associated with the home network 150. Stationary devices can be connected to the home network while personal devices can be connected or disconnected to the home network 150. While personal devices can be disconnected to the home network 150, the personal devices can still maintain association with the home network 150. The association can be by an identification number associated with the personal device, a user profile, a previous connection to the home network 150, or by a user setting within the personal device.

One or more embodiments of this disclosure recognize that it is customary for consumers to take personal devices outside of the home or home network 150. The presence or absence of a personal device in the home can be an indicator whether a user is in the home. So information on presence of personal devices can be used to refine security policy of stationary devices, in addition to policy defined by house security system. Personal devices can be defined as "security controllers" or detected automatically based on daily usage/movement pattern, such as the time of day the personal device enters and leaves a home network 150 or home.

One or more embodiments of this disclosure provides automatically password-protecting stationary devices when left in the home or home network 150 and not be used for some time, to protect information they contain in case of burglary. For example, when a user leaves the home or a personal device disconnects from the home network 150, the security system may arm and all stationary devices in the home or connected to the home network 150 are generating or configuring a password. Upon successful unlocking of a residence, disarming an alarm, or a personal device connecting to the home network 150, the stationary devices would again enter a lower secure state or unlock.

In various embodiments of this disclosure, home network 150 can be associated with home 160. The home 160 can be a physical structure, zone, or an area defined by a geo-fencing. The home 160 can be associated with the home network 150, wherein the home network 150 is located within the home 160. In another embodiment, a zone can be set as a room of the home or outside of the home. The home 160 can also include devices configured to determine whether the home is entered or whether a user is present in the home 160. For example, the home 160 includes a device associated with a door of the home 160. The device associated with the door can determine whether a key is used to lock or unlock the door. In another embodiment, the door does not use keys, but lock and unlock by wireless communication, such as, but not limited to, BLUETOOTH, Wi-fi, a mobile app, and the like.

Figure 2:
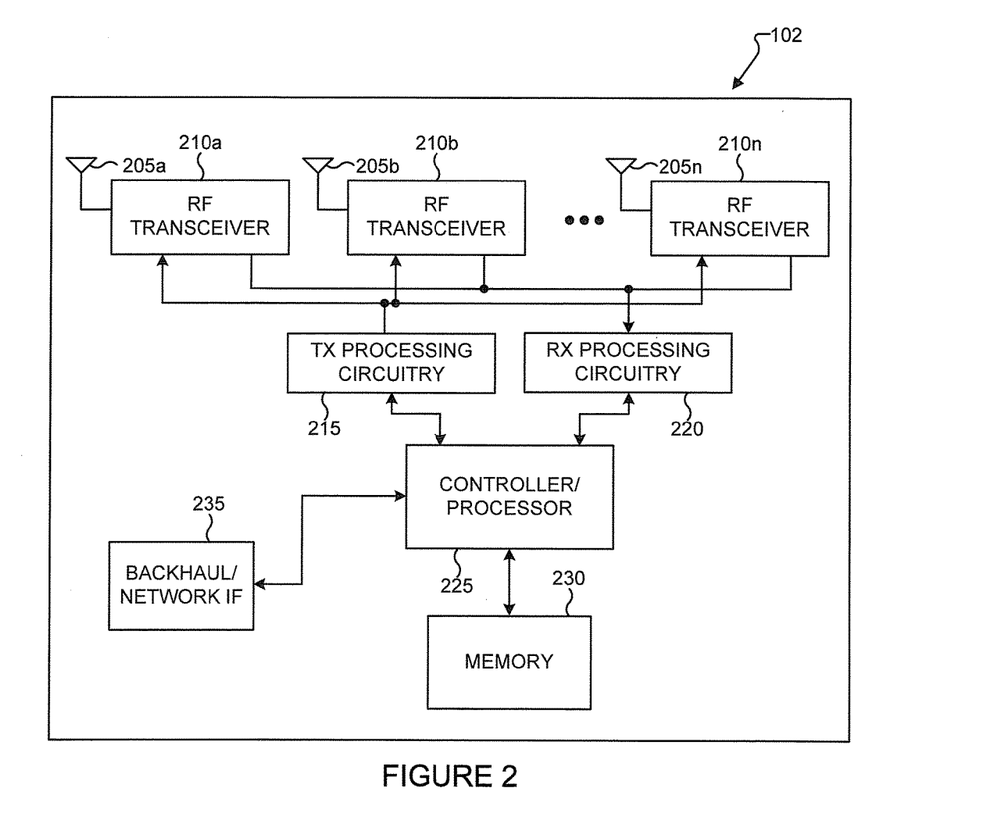
FIG. 2 illustrates an example eNB according to this disclosure.

FIG. 2 illustrates an example eNB 102 according to this disclosure. The embodiment of the eNB 102 illustrated in FIG. 2 is for illustration only, and the eNBs 101 and 103 of FIG. 1A could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
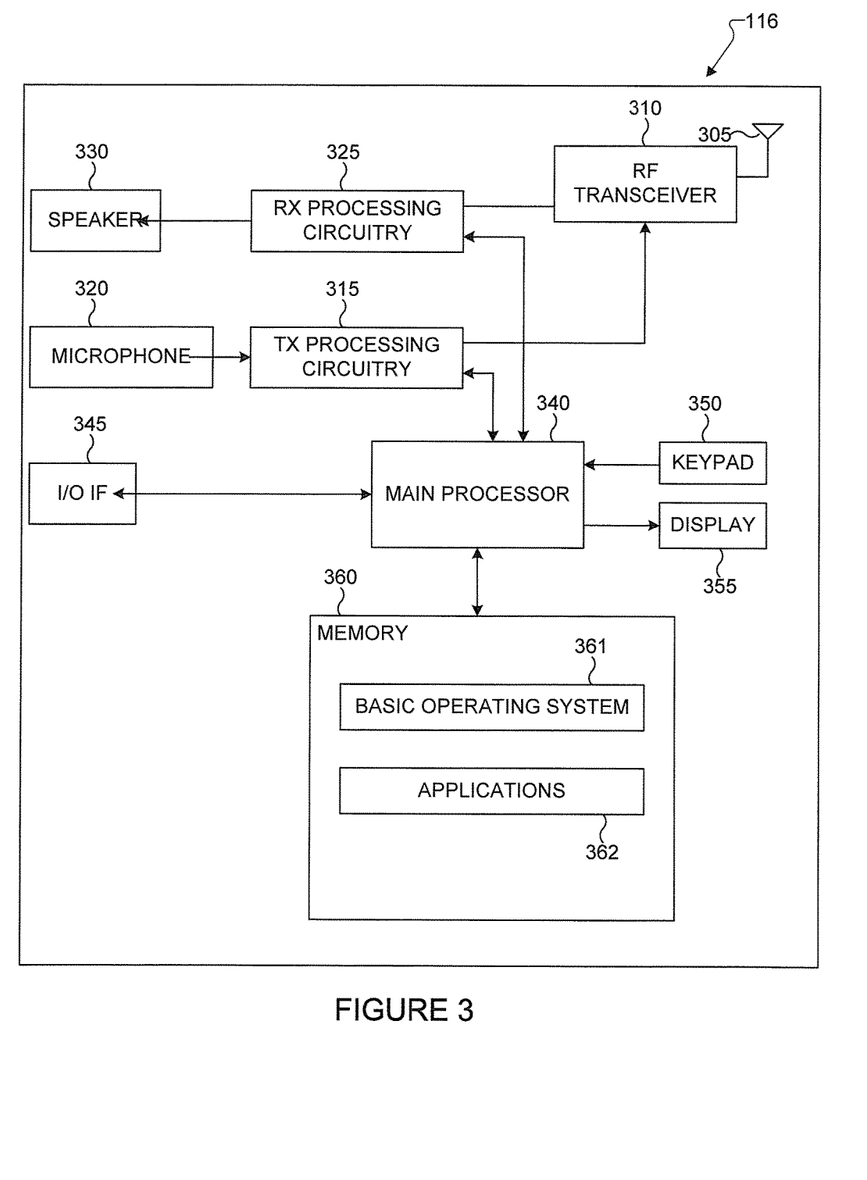
FIG. 3 illustrates an example UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

An embodiment of this disclosure provides a method for securing electronic devices based on the state of a physical lock and/or security system, as well as the presence/absence of certain devices.

TABLE 1 shows a table of four security states of a home, in combination with presence of people (or personal devices) in the home according to an embodiment of this disclosure. TABLE 1 identifies when a combination of those two factors causes stationary devices to be automatically password protected.

TABLE 1

|  | People present | No people present |
|---|---|---|
| OPEN | UNLOCKED | LOCKED after a timeout. |
| LOCKED | UNLOCKED | LOCKED |
| ARMED | UNLOCKED | LOCKED |
| ALARM | LOCKED | LOCKED |

Figure 4:
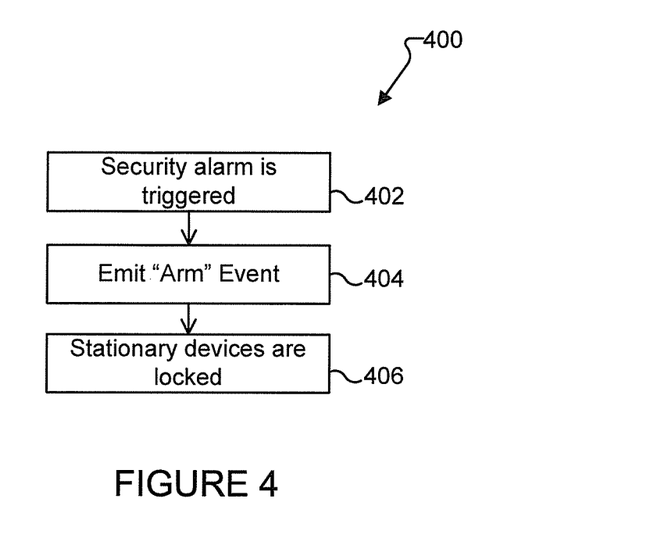
FIG. 4 illustrates a process when a house security system goes into an alarm state according to an embodiment of this disclosure.

FIG. 4 illustrates a process 400 when a house security system goes into an alarm state according to an embodiment of this disclosure. The process 400 illustrated in FIG. 4 is for illustration only, and can be executed by one or more components as described in FIGS. 1A-3, such as a controller, processor, and/or processing circuitry. However, the operations of process 400 come in a wide variety of configurations, and FIG. 4 does not limit the scope of this disclosure to any particular implementation of process 400.

In FIG. 4, at operation 402, a processor identifies a security alarm being triggered. At operation 404, the processor emits and "arm" event. An "arm" event can also be referred to as an arm signal. An arm signal can be a signal that a processor at a device or server sends to other devices to arm or lock. A "disarm" event can be referred to as an disarm signal. A disarm signal can be a signal that a processor at a device or server sends to other devices to disarm or unlock. At operation 406, the stationary devices are locked. The "arm" event can cause all stationary devices to be password protected. In addition, the stationary devices can switch into "high alert" mode to automatically become Internet protocol (IP) security cameras, record sounds, and the like. The stationary devices can also be programmed to wipe all data if disconnected from home network and/or taken outside of a geo-fencing zone. The zone may be set by a geographical area.

Figure 5:
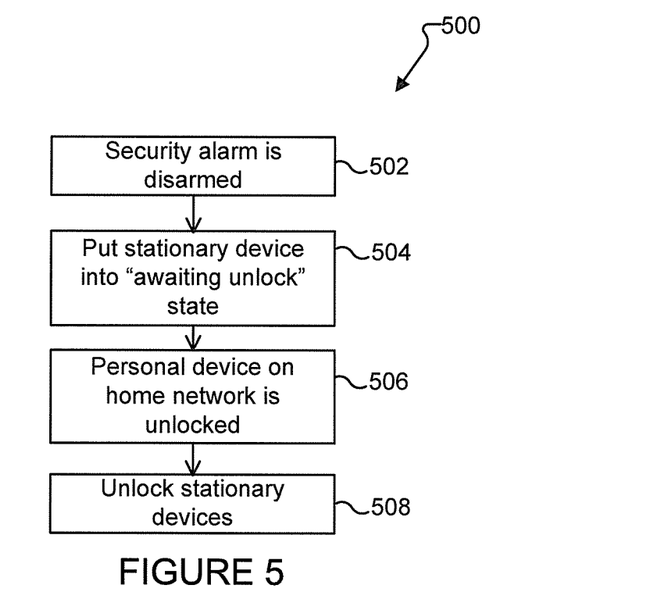
FIG. 5 illustrates a process when a house security alarm is disarmed according to an embodiment of this disclosure.

FIG. 5 illustrates a process 500 when house security alarm is disarmed according to an embodiment of this disclosure. The process 500 illustrated in FIG. 5 is for illustration only, and can be executed by one or more components as described in FIGS. 1A-3, such as a controller, processor, and/or processing circuitry. However, the operations of process 500 come in a wide variety of configurations, and FIG. 5 does not limit the scope of this disclosure to any particular implementation of process 500.

In FIG. 5, at operation 502, a processor identifies a security alarm being disarmed. At operation 504, the processor sends a signal to put the stationary devices in an "awaiting unlock" state. At operation 506, the processor identifies when a personal device on the home network is unlocked. At operation 508, the processor sends a signal to unlock the stationary devices. In this embodiment, all stationary devices remain locked until a personal device is unlocked.

Figure 6:
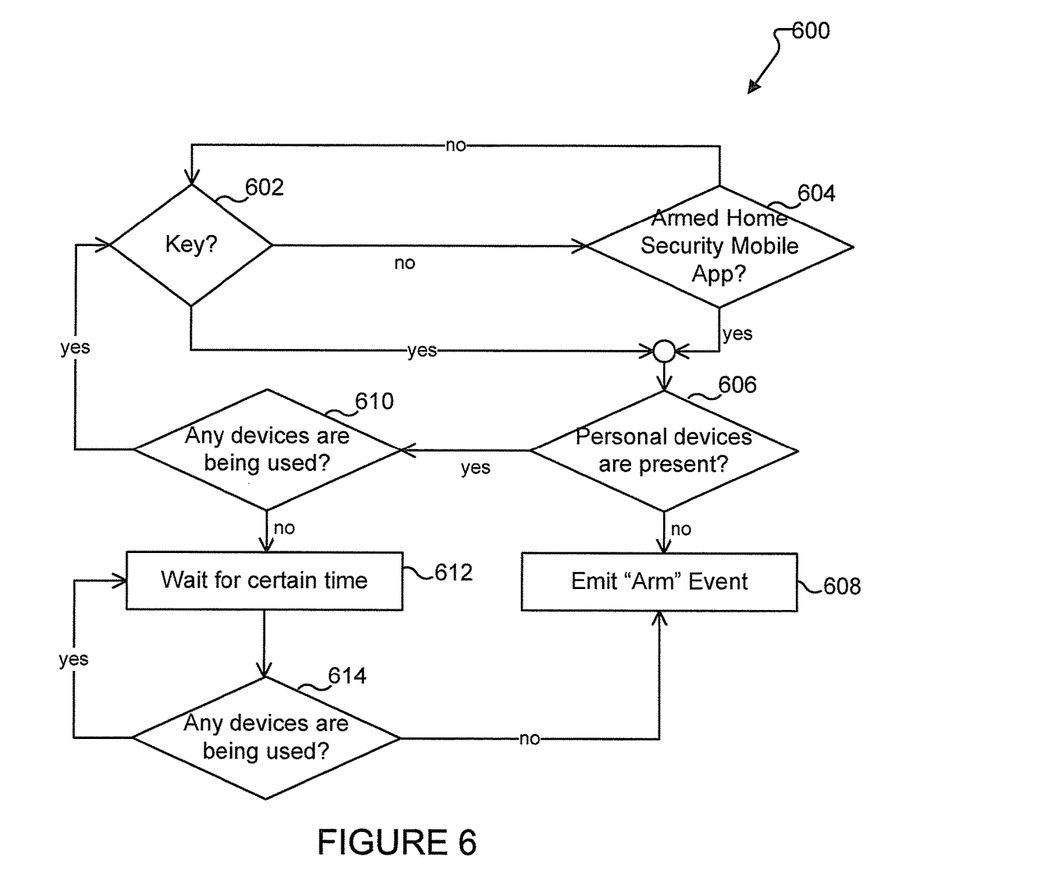
FIG. 6 illustrates a process when a house is locked or the security system is armed according to an embodiment of this disclosure.

FIG. 6 illustrates a process 600 when house is locked or security system is armed according to an embodiment of this disclosure. The process 600 illustrated in FIG. 6 is for illustration only, and can be executed by one or more components as described in FIGS. 1A-3, such as a controller, processor, and/or processing circuitry. However, the operations of process 600 come in a wide variety of configurations, and FIG. 6 does not limit the scope of this disclosure to any particular implementation of process 600.

In FIG. 6, at operation 602, a processor determines whether home is locked using a key or the like. If the home is not locked, at operation 604, the processor determines whether the security system is armed. If the security system is not armed, the process 600 moves to operation 602. A presence event is an event at the home that indicates whether a user is present at the home and/or whether the user is leaving or arriving at the home. Unlocking or locking a home with a key can be a presence event. Additionally, arming or disarming a security system at the home can be a presence event. Additionally, a personal device connecting or disconnecting from a home network can be a presence event. Additionally, retrieving information related to a location of the personal device can indicate a presence event.

The location of the personal device can be received from a global positioning system or geo-fencing system. For example, if the personal device is located in the home where the personal device was previously outside of the home, the presence event can be triggered indicating that user arrived home. A personal device is "present" when it is either in a location within the home or connected to the home network.

If at operation 602, a key is used to lock the home, or at operation 604, the security system is armed, then at operation 606, the processor determines whether personal devices are present. If personal devices are not present, at operation 608, the processor emits an "arm" event. If the personal devices are present, at operation 610, the processor determines whether the personal devices are being used. If the personal devices are being used, then the process 600 moves to operation 602.

If the personal devices are not being used, then at operation 612, the processor waits for a certain amount of time. The certain amount of time can be a predetermined amount of time, or dynamically determined based on prior usage. At operation 614, the processor determines whether the personal devices are being used. If the personal devices are being used, the process 600 moves to operation 612. If the personal devices are not being used, at operation 608, the processor emits an "arm" event. In this embodiment, stationary devices are password protected only if no personal devices are present, or personal devices have not been used for certain period of time.

Figure 7:
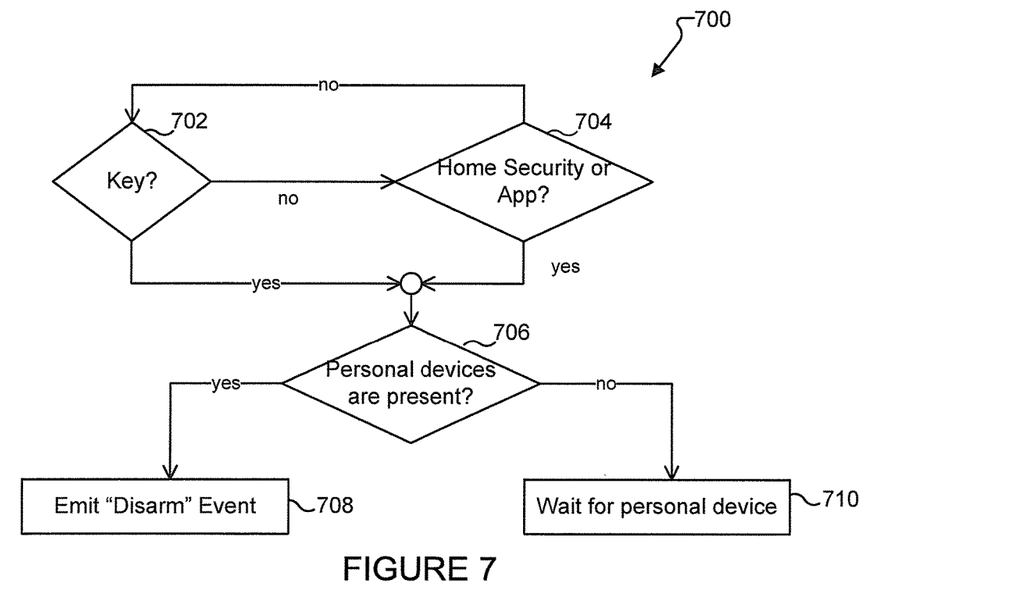
FIG. 7 illustrates a process when a house is unlocked using a key or a security system is disarmed according to an embodiment of this disclosure.

FIG. 7 illustrates a process 700 when house is unlocked using a key or a security system is disarmed according to an embodiment of this disclosure. The process 700 illustrated in FIG. 7 is for illustration only, and can be executed by one or more components as described in FIGS. 1A-3, such as a controller, processor, and/or processing circuitry. However, the operations of process 700 come in a wide variety of configurations, and FIG. 7 does not limit the scope of this disclosure to any particular implementation of process 700.

In FIG. 7, at operation 702, a processor determines whether home is locked using a key or the like. If the home is not locked, at operation 704, the processor determines whether the security system is armed. If the security system is not armed, the process 700 moves to operation 702.

If at operation 702, a key is used to lock the home, or at operation 704, the security system is armed, then at operation 706, the processor determines whether personal devices are present. If personal devices are not present, at operation 710, the processor waits for a personal device. If the personal devices are present, at operation 708, the processor emits a "disarm" event. The "disarm" event unlocks the stationary devices connected to the home network. Unlocking the home, or disarming a security system, in combination with the presence of a personal device, unlocks stationary devices.

Figure 8:
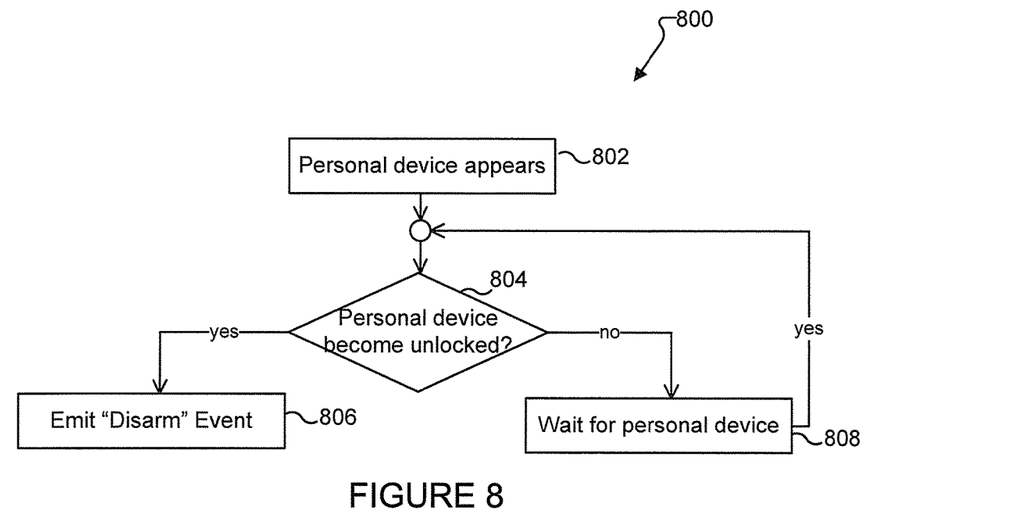
FIG. 8 illustrates a process when a personal device on the home network is unlocked from the locked state according to an embodiment of this disclosure.

FIG. 8 illustrates a process 800 when personal device on the home network is unlocked from the locked state according to an embodiment of this disclosure. The process 800 illustrated in FIG. 8 is for illustration only, and can be executed by one or more components as described in FIGS. 1A-3, such as a controller, processor, and/or processing circuitry. However, the operations of process 800 come in a wide variety of configurations, and FIG. 8 does not limit the scope of this disclosure to any particular implementation of process 800.

In FIG. 8, at operation 802, a processor identifies the appearance of a personal device. At operation 804, the processor determines whether the personal device becomes unlocked. If the personal device becomes unlocked, then at operation 806, the processor emits a "disarm" event. If the personal device is not unlocked, then at operation 808, the processor waits for the personal device to unlock and the process 800 moves to operation 804.

In an embodiment, process 800 can be executed while a user is inside of a locked house. For example, a home is locked at night and all devices auto-locked after a period of inactivity. In this case, password protection is removed from all stationary devices.

Figure 9:
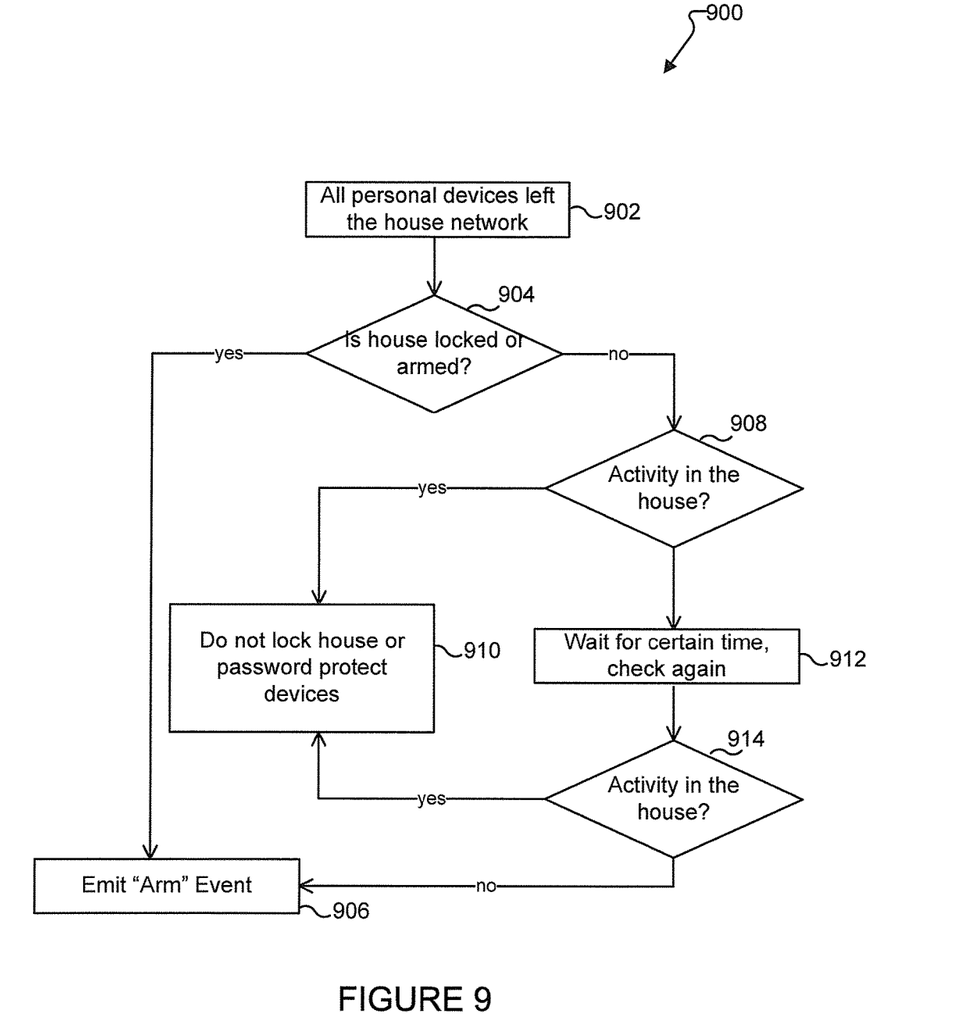
FIG. 9 illustrates a process when all personal devices left the house but a door was left unlocked and/or the security system was not armed according to an embodiment of this disclosure.

FIG. 9 illustrates a process 900 when all personal devices left the house but a door was left unlocked and/or security system was not armed according to an embodiment of this disclosure. The process 900 illustrated in FIG. 9 is for illustration only, and can be executed by one or more components as described in FIGS. 1A-3, such as a controller, processor, and/or processing circuitry. However, the operations of process 900 come in a wide variety of configurations, and FIG. 9 does not limit the scope of this disclosure to any particular implementation of process 900.

In FIG. 9, at operation 902, a processor identifies that all personal devices have left the home network. In another embodiment, operation 902 may identify that a single personal device has left the home network. At operation 904, the processor determines whether the home is locked or a security system is armed. If the home is locked or the security system is armed, then at operation 906, the processor emits an "arm" event. If the home is unlocked and the security system is unarmed, then at operation 908, the processor determines whether there is activity in the home. The activity can be home activity, such as, but not limited to motion sensors and/or the activity can be personal device activity. As used herein, a home is unlocked or unlocked when an electronic device is configured to indicate whether the home is unlocked or locked. For example, an electronic device can be associated with a door to a home.

If there is activity in the home, at operation 910, the processor does not cause the stationary devices to lock or password protect. If there is no activity in the home, at operation 912, the processor waits for a predetermined amount of time. Then, after the predetermined amount of time, at operation 914, the processor again determines whether there is activity in the home. If there is activity in the home, at operation 910, the processor does not cause the house to lock or password protect the stationary devices. If there is no activity in the home, at operation 906, the processor emits an "arm" event.

In one or more embodiments, activity in the house is checked using motion sensors and usage of stationary devices. If no activity is detected, stationary devices are locked. Optionally, personal devices can be notified with an option to lock the house and/or arm the security system.

Figure 10:
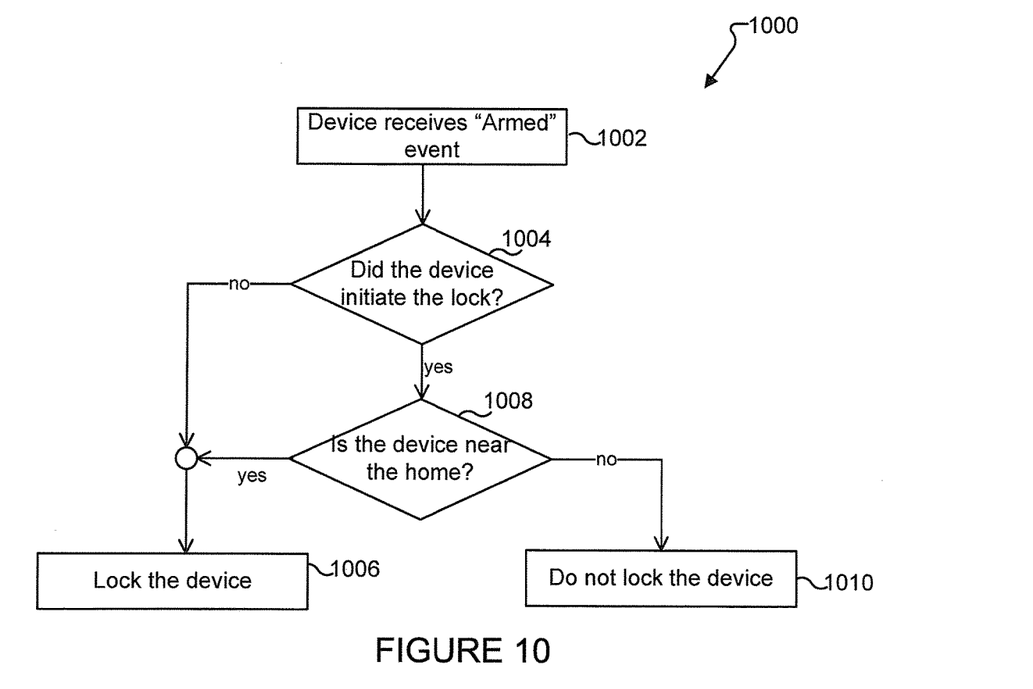
FIG. 10 illustrates a process of stationary devices responding to "arm" events according to an embodiment of this disclosure.

FIG. 10 illustrates a process 1000 of stationary devices responding to "arm" events according to an embodiment of this disclosure. The process 1000 illustrated in FIG. 10 is for illustration only, and can be executed by one or more components as described in FIGS. 1A-3, such as a controller, processor, and/or processing circuitry. However, the operations of process 1000 come in a wide variety of configurations, and FIG. 10 does not limit the scope of this disclosure to any particular implementation of process 1000.

In FIG. 10, at operation 1002, a processor receives an "arm" event. At operation 1004, the processor determines whether the electronic device initiate the lock. In other words, the processor determines whether the electronic device initiated the "arm" event. The electronic device can be a stationary or personal device. If the device did not initiate the lock, then at operation 1006, the processor locks the device. If the device initiated the lock, then at operation 1008, the processor determines whether the device is near the home. The device can be determined to be near the home by using geo-fencing, global positioning system information, whether the device is connected to the home network, and the like. If the device is near the home, then at operation 1006, the processor locks the device. If the device is not near the home, then at operation 1010, the processor does not lock the device.

Figure 11:
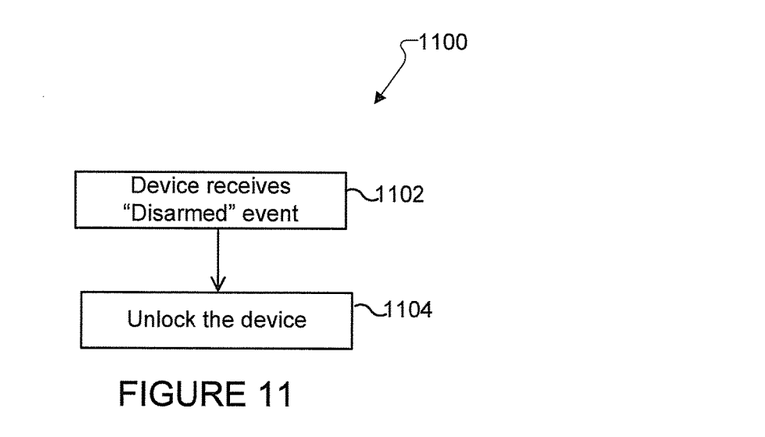
FIG. 11 illustrates a process of stationary devices responding to "disarm" events according to an embodiment of this disclosure.

FIG. 11 illustrates a process 1100 of stationary devices responding to "disarm" events according to an embodiment of this disclosure. The process 1100 illustrated in FIG. 11 is for illustration only, and can be executed by one or more components as described in FIGS. 1A-3, such as a controller, processor, and/or processing circuitry. However, the operations of process 1100 come in a wide variety of configurations, and FIG. 11 does not limit the scope of this disclosure to any particular implementation of process 1100. In FIG. 11, at operation 1102, a processor receives a "disarm" event. At operation 1104, the processor unlocks the device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for securing electronic devices, the method comprising:
    identifying a plurality of electronic devices, wherein the plurality of electronic devices includes at least one stationary device connected to a home network and a plurality of personal devices associated with the home network;
    monitoring the home network for a presence event including one of the plurality of personal devices connecting to or disconnecting from the home network;
    responsive to an occurrence of the presence event, determining after a predetermined period of time whether any of the plurality of personal devices is present; and
    responsive to an absence of the presence event during the predetermined period of time, locking the at least one stationary device such that the occurrence of the presence event in the home network or entry of a password to the at least one stationary device is required to unlock the at least one stationary device.

2. The method of claim 1, wherein the home network is associated with a home.

3. The method of claim 2, wherein the home is a zone set by a geographical area.

4. The method of claim 1, wherein the presence event further comprises one of the plurality of personal devices entering or leaving a home associated with the home network.

5. The method of claim 1, wherein the presence event further comprises a door of a home associated with the home network being locked or unlocked.

6. The method of claim 1, wherein the presence event further comprises a security system of a home associated with the home network being armed or disarmed.

7. The method of claim 1, wherein determining after the predetermined period of time whether one of the plurality of personal devices is present comprises:
    determining whether a location of the one of the plurality of personal devices is within a home; and
    responsive to the location of the one of the plurality of personal devices being within the home, identifying the one of the plurality of personal devices as being present.

8. The method of claim 1, wherein determining after the predetermined period of time whether one of the plurality of personal devices is present comprises:
    determining whether the one of the plurality of personal devices is connected to the home network; and
    responsive to the one of the plurality of personal devices being connected to the home network, identifying the one of the plurality of personal devices as being present.

9. The method of claim 1, further comprising:
    unlocking the at least one stationary device when one of the plurality of personal devices is present after the predetermined period of time.

10. The method of claim 9, wherein the at least one stationary device remains unlocked while the one of the plurality of personal devices remains present.

11. The method of claim 9, wherein unlocking the at least one stationary device when the one of the plurality of personal devices is present after the predetermined period of time comprises unlocking the at least one stationary device when the one of the plurality of personal devices is present after the predetermined period of time and the one of the plurality of personal devices is unlocked.

12. The method of claim 1, wherein locking includes password protecting.

13. The method of claim 1, further comprising:
    responsive to one of the plurality of personal devices being present, determining whether the one of the plurality of personal devices is being used; and
    responsive to the one of the plurality of personal devices not being used, locking the at least one stationary device.

14. An apparatus, comprising:
    a memory element; and
    processing circuitry coupled to the memory element, the processing circuitry configured to:
        identify a plurality of electronic devices, wherein the plurality of electronic devices includes at least one stationary device connected to a home network and a plurality of personal devices associated with the home network;
        monitor the home network for a presence event including one of the plurality of personal devices connecting to or disconnecting from the home network;
        responsive to an occurrence of the presence event, determine after a predetermined period of time whether any of the plurality of personal devices is present; and
        responsive to an absence of the presence event during the predetermined period of time, lock the at least one stationary device such that the occurrence of the presence event in the home network or entry of a password to the at least one stationary device is required to unlock the at least one stationary device.

15. The apparatus of claim 14, wherein the home network is associated with a home.

16. The apparatus of claim 15, wherein the home is a zone set by a geographical area.

17. The apparatus of claim 14, wherein the presence event further comprises one of the plurality of personal devices entering or leaving a home associated with the home network.

18. The apparatus of claim 14, wherein the presence event further comprises a door of a home associated with the home network being locked or unlocked.

19. The apparatus of claim 14, wherein the presence event further comprises a security system of a home associated with the home network being armed or disarmed.

20. The apparatus of claim 14, wherein, to determine after the predetermined period of time whether one of the plurality of personal devices is present, the processing circuitry is configured to:
   determine whether a location of the one of the plurality of personal devices is within a home; and
   responsive to the location of the one of the plurality of personal devices being within the home, identify the one of the plurality of personal devices as being present.

21. The apparatus of claim 14, wherein, to determine after the predetermined period of time whether one of the plurality of personal devices is present, the processing circuitry is configured to:
   determine whether the one of the plurality of personal devices is connected to the home network; and
   responsive to the one of the plurality of personal devices being connected to the home network, identify the one of the plurality of personal devices as being present.

22. The apparatus of claim 14, wherein the processing circuitry is further configured to unlock the at least one stationary device when one of the plurality of personal devices is present after the predetermined period of time.

23. The apparatus of claim 14, wherein the processing circuitry is further configured to:
   responsive to one of the plurality of personal devices being present, determine whether the one of the plurality of personal devices is being used; and
   responsive to the one of the plurality of personal devices not being used, lock the at least one stationary device.

* * * * *